United States Patent
Pupius et al.

(10) Patent No.: US 7,424,682 B1
(45) Date of Patent: Sep. 9, 2008

(54) ELECTRONIC MESSAGES WITH EMBEDDED MUSICAL NOTE EMOTICONS

(75) Inventors: Daniel F. Pupius, San Francisco, CA (US); Jonathan D. Perlow, Seattle, WA (US); Aaron D. Whyte, San Jose, CA (US); David M. Cohen, Mountain View, CA (US); Keith H. Coleman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 13 days.

(21) Appl. No.: 11/419,342

(22) Filed: May 19, 2006

(51) Int. Cl.
  *G06F 3/048* (2006.01)
  *G06F 15/16* (2006.01)
  *A63H 5/00* (2006.01)

(52) U.S. Cl. .................. 715/758; 84/609; 709/206

(58) Field of Classification Search ............ 84/609, 84/477 R, 483.2; 709/206; 715/758
See application file for complete search history.

(56) References Cited

U.S. PATENT DOCUMENTS

| | | | |
|---|---|---|---|
| 6,291,756 B1 * | 9/2001 | Urbanek | 84/477 R |
| 6,385,581 B1 * | 5/2002 | Stephenson | 704/270 |
| 6,411,198 B1 * | 6/2002 | Hirai et al. | 340/7.6 |
| 6,963,839 B1 | 11/2005 | Ostermann et al. | 407/260 |
| 6,976,082 B1 | 12/2005 | Ostermann et al. | 709/231 |
| 6,990,452 B1 | 1/2006 | Ostermann et al. | 704/260 |
| 2002/0193996 A1 * | 12/2002 | Squibbs et al. | 704/260 |
| 2004/0024822 A1 * | 2/2004 | Werndorfer et al. | 709/206 |
| 2005/0223071 A1 * | 10/2005 | Hosono | 709/206 |
| 2006/0015560 A1 * | 1/2006 | MacAuley et al. | 709/206 |
| 2006/0059236 A1 * | 3/2006 | Sheppard et al. | 709/206 |
| 2006/0212818 A1 * | 9/2006 | Lee | 715/753 |

OTHER PUBLICATIONS

MSN Emoticons. <http://web.archive.org/web/20040127040047/http://elouai.com/msn-emoticons.php>. Jan. 27, 2004.*
"A Meeting of Minds—An Anne McCaffrey Discussion Forum re Chat FAQ," http://forums.srellim.org/faq-php?faq+chat_faq.
Talkysoft.com, "Translate Emoticons Into Sound," http://www.talkysoft.com/talkymsn/help/emoticons.html.

* cited by examiner

*Primary Examiner*—Lincoln Donovan
*Assistant Examiner*—Andrew R Millikin
(74) *Attorney, Agent, or Firm*—Morgan, Lewis & Bockius LLP

(57) ABSTRACT

A computer implemented method for authoring a message includes enabling a user to compose an electronic message that includes a sequence of musical note emoticons, embedding the musical note emoticons in the electronic message, and sending the electronic message. The sequence of musical note emoticons represent an audible musical sequence. A computer implemented method for receiving a message includes receiving an electronic message, including at least one musical note emoticon embedded in the electronic message, displaying the electronic message, including the musical note emoticon; and audibly playing the embedded musical note emoticon.

23 Claims, 8 Drawing Sheets

ELECTRONIC MESSAGES WITH EMBEDDED MUSICAL NOTE EMOTICONS

TECHNICAL FIELD

The disclosed embodiments relate generally to sending and receiving electronic messages through email or instant messaging service. In particular, the disclosed embodiments relate to electronic messages that are audible, as well as visual.

BACKGROUND

Electronic messages may be sent from person to person via email messaging systems or instant messaging systems. Such messages typically contain text, but may also contain a sequence of printable characters, such as :), ^_^, or :-(, or a small image (e.g., an image whose size is 12 to 32 pixels in height and 12 to 32 pixels in width, with 12×14 pixels and 16×16 pixels being exemplary sizes) that is intended to represent a human facial expression and convey an emotion. These characters or small images are known as emoticons.

SUMMARY

A computer implemented method for authoring a message includes composing an electronic message, including entering a plurality of musical note emoticons, embedding the musical note emoticons in the electronic message, and sending the electronic message.

A computer implemented method for receiving a message includes receiving an electronic message, including at least one musical note emoticon embedded in the electronic message, displaying the electronic message, including the musical note emoticon; and audibly playing the embedded musical note emoticon.

A system for authoring a message includes memory, one or more processors; and one or more modules stored in memory and configured for execution by the one or more processors. The modules include instructions for composing an electronic message, including entering a plurality of musical note emoticons, instructions for embedding the musical note emoticons in the electronic message, and instructions for sending the electronic message.

A system for receiving a message includes memory, one or more processors, one or more speakers, and one or more modules stored in memory and configured for execution by the one or more processors. The modules include instructions for receiving an authored electronic message, including at least one audible musical note emoticon embedded in the electronic message, instructions for displaying the electronic message, including the musical note emoticon, and instructions for audibly playing the embedded musical note emoticon.

A computer program product for use in conjunction with a computer, the computer program product includes a computer readable storage medium and a computer program mechanism embedded therein. The computer program mechanism includes instructions for receiving an authored electronic message, including at least one audible musical note emoticon embedded in the electronic message, instructions for displaying the electronic message, including the musical note emoticon, and instructions for audibly playing the embedded musical note emoticon.

A computer includes a means for composing an electronic message, including entering a plurality of musical note emoticons, a means for embedding the musical note emoticons in the electronic message; and a means for sending the electronic message.

A computer including a means for receiving an authored electronic message, including at least one audible musical note emoticon embedded in the electronic message, a means for displaying the electronic message, including the musical note emoticon, and a means for audibly playing the embedded musical note emoticon.

DETAILED DESCRIPTION OF THE INVENTION

Figure 1A:
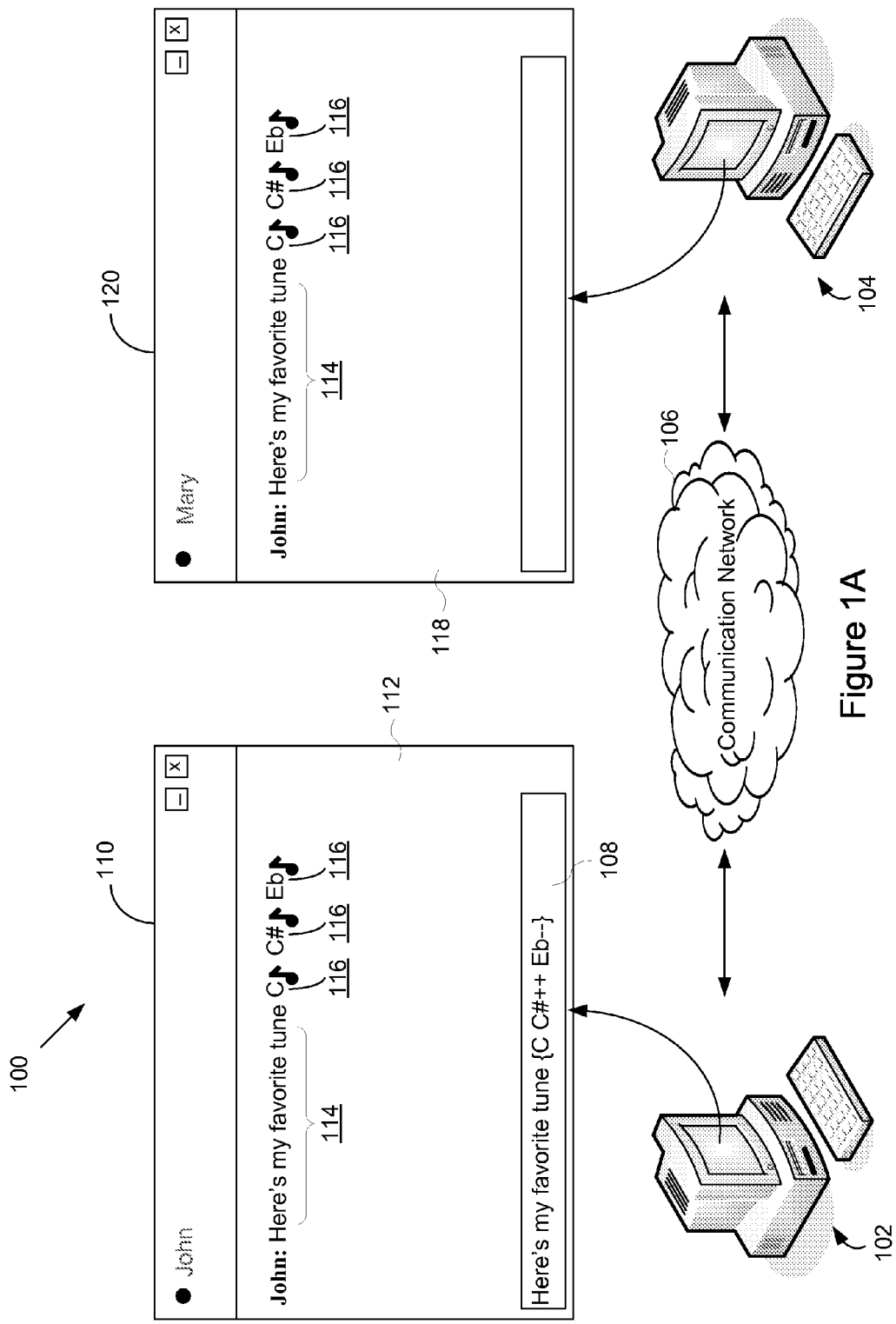
FIG. 1A is a diagram illustrating a process for sending and receiving an electronic message with embedded musical note emoticons.

FIG. 1A is a diagram illustrating a distributed system 100 for sending and receiving an electronic message with embedded musical note emoticons, sometimes herein called musical emoticons for convenience. Sending client 102 and receiving client 104 are connected via communication network 106. A message sender may compose an electronic message via message client 102 in composition field 108 of message window 110. The message window 110 may also be called the message composition graphical user interface (GUI). The message sender types in text, as well as characters representing musical note emoticons in the composition field 108. Once the message sender enters the text, the message, with the embedded musical note emoticon appears in display field 112. The characters entered by the message sender appear as text 114 and musical note emoticons 116. In some embodiments, each embedded musical note emoticon 116 is represented by an image of one or more musical notes, the image having a size of 12 to 32 pixels in height and 12 to 64 pixels in width. A respective musical note emoticon 116 may represent a note on a diatonic scale or any other suitable musical scale. The electronic message is also sent to message recipient on receiving client 104. The message is displayed in display field 118 of message window 120 of receiving client 104. Each musical note emoticon 116 is also audibly played on both sending client 102 and receiving client 104.

Figure 1B:
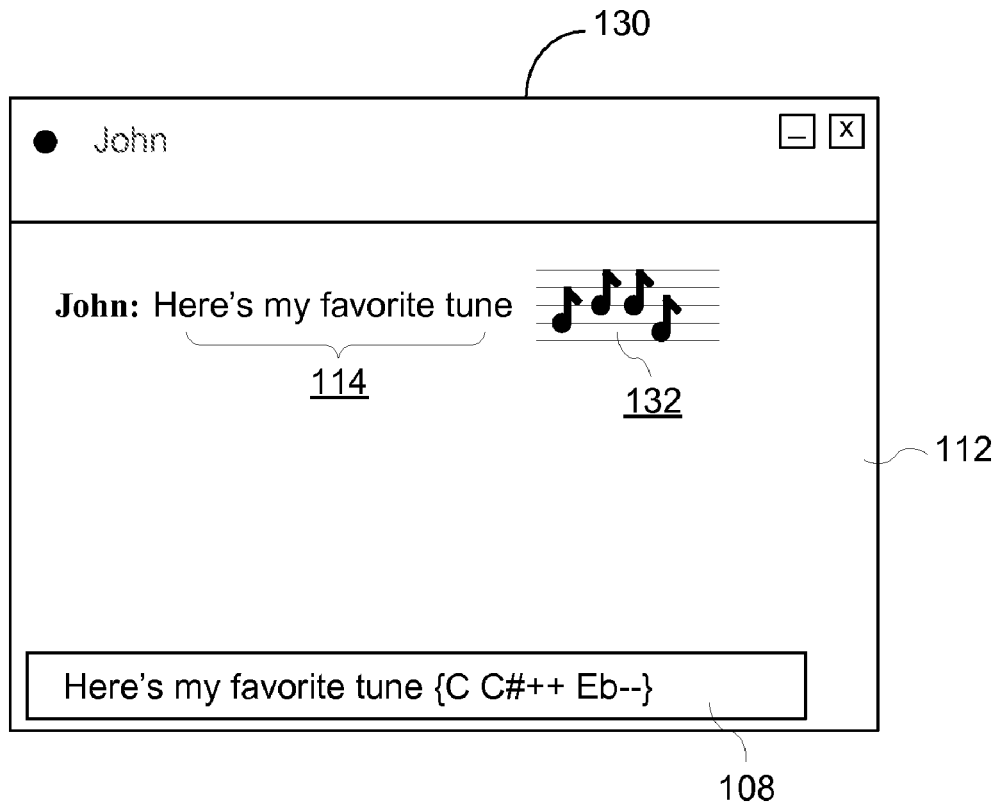
FIG. 1B is a schematic screenshot of a message window with an embedded musical note emoticon where the emoticon represents a song pattern.

FIG. 1B is a schematic screenshot of an alternative embodiment of the message window 110 or 120 of the sending or receiving client 102, 104. In this embodiment, message window 130 displays an embedded musical emoticon 132, where the emoticon 132 represents a song pattern. In some embodiments, the embedded musical emoticon 132 is represented by an image of two or more musical notes, the image having a size of 12 to 32 pixels in height and 20 to 64 pixels in width. The image for musical emoticon 132 may be an image of one or more musical notes. In some embodiments, however, the image for musical emoticon 132 may be a facial expression or other image selected by the message's author (e.g., selected from a menu or other set of images). In this case, the image for musical emoticon 132 may represent an emotion, mood, activity or the like that corresponds (at least in the opinion of the message author) to the music notes of the musical emoticon 132. In another embodiment, the user may select a predefined sequence of notes or sounds to associate with an emoticon that is to be inserted, or which has already been inserted, into an electronic message. The user may select a predefined sequence of notes or sounds that is appropriate to, or perhaps dissonant to, the emoticon. In yet another embodiment, an electronic authoring tool may include a set or menu of musical emoticons that already have associated with them respective predefined sequences of notes or sounds. The respective predefined sequences of notes or sounds for any one musical emoticon may correspond to the emotion, facial expression or other image of the musical emoticon. Upon insertion of any such musical emoticon into an electronic message, both the visual and audible features of the musical emoticon are embedded or otherwise included in the electronic message.

In some embodiments, a message sender may type in a message, including musical emoticons, in the composition field 108. The message is then displayed in the display field 112. In these embodiments, the text 114, along with a single musical emoticon 132 is displayed, and the musical emoticon is audibly played. The musical emoticon 132 represents an entire song or a song pattern (i.e., a portion of a song having multiple notes), as opposed to representing one single musical note (as shown in FIG. 1A). In some embodiments, the musical emoticon 132 represents a verse of a song. In yet other embodiments, the musical emoticon 132 represents a single note if the authoring user has entered only a single musical emoticon and otherwise, when the authoring user has entered a set of two or more musical emoticons, represents a sequence or pattern of musical notes. A pattern of musical notes represented by a musical emoticon 116 or 132 may include a sequence of notes as well as chords or other simultaneously played notes.

Figure 1C:
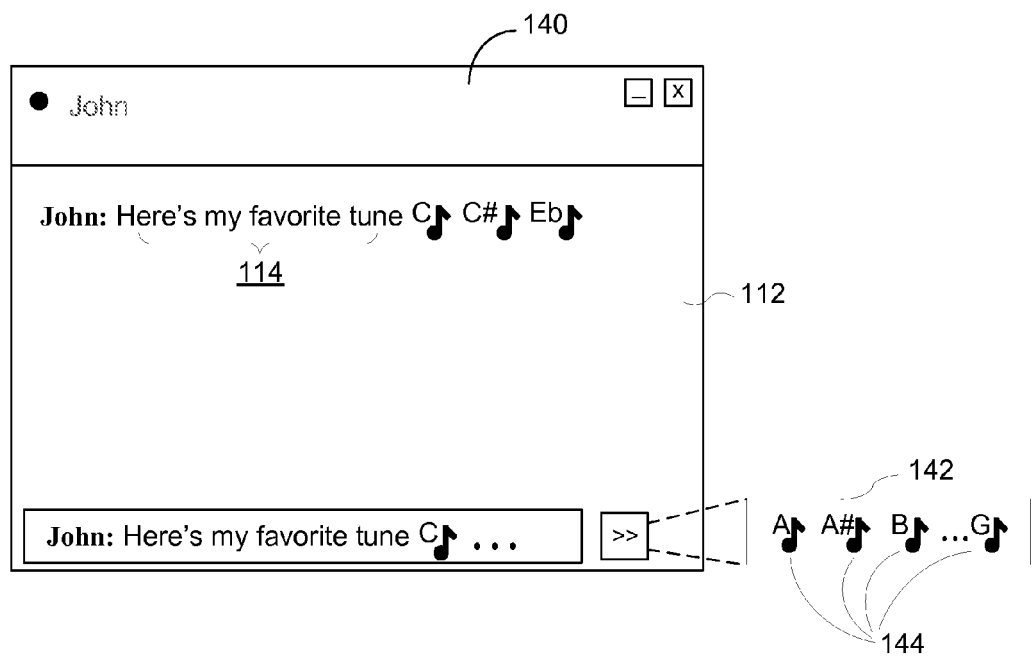
FIG. 1C is a schematic screenshot of a message window where the message composition window includes a menu of predefined musical note emoticons.

FIG. 1C is a schematic screenshot of a message window 140 where the message composition window includes a menu 142 of predefined musical emoticons 144. In some embodiments, a message sender may type in text in the composition field 108 and enter musical emoticons by selecting from a set or menu 142 of predefined musical emoticons 144. The predefined musical emoticons 144 may be displayed in an expandable menu 142 or by selectable buttons.

Figure 2:
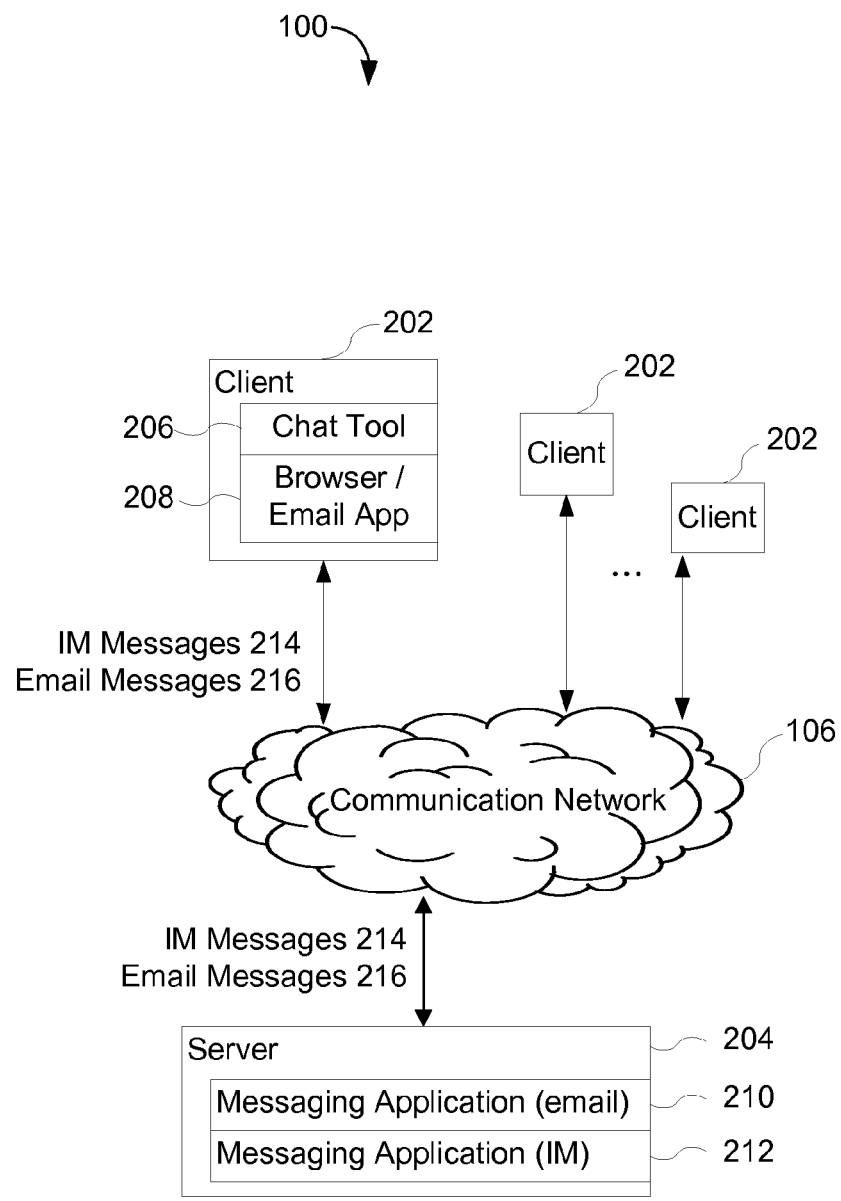
FIG. 2 is a block diagram illustrating a distributed system for sending and receiving an electronic message with embedded musical note emoticons.

FIG. 2 is a block diagram illustrating the distributed system 100 for sending and receiving an electronic message with one or more embedded musical emoticons, 116 or 132. Clients 202 are connected to server 204 via communication network 106. The communication network 106 can be any local area network (LAN) and/or wide area network (WAN), such as an intranet, an extranet, the Internet or a combination of such networks. It is sufficient that the communication network 106 provides communication capability between the clients 202 and the server 204. In some embodiments, the communication network 106 uses HyperText Transport Protocol (HTTP) to transport information using the Transmission Control Protocol/Internet Protocol (TCP/IP). The HTTP permits client computers to access various resources available via the communication network 106. The various embodiments of the invention, however, are not limited to the use of any particular protocol. The term "resource" as used throughout this specification refers to any piece of information or service that is accessible via a Uniform Resource Locator (URL) and can be, for example, a web page, a text or word processing document, an email message, a transcribed voice message, a database, an image, or a computational object.

The client 202 can be any of a number of devices (e.g. a computer, an internet kiosk, a personal digital assistant, a cell phone, a desktop computer, or a laptop computer) and can include a chat tool 206 and a client application 208. The client application 208 may permit a user to view web pages or other documents or information. The client application 208 may be a software application that permits a user to interact with the client 202 and/or network resources to perform one or more tasks. For example, the client application 208 can be a web browser (e.g., Firefox) or other type of application that permits a user to search for, browse, and/or use resources, such as one or more web pages on the client 102 and/or accessible via the communication network 106. The client application 208 may also include an email application (e.g. Lotus Notes or Outlook).

The server 204 may include one or more messaging applications 210 for storing, indexing, searching and transporting email messages and one or more messaging applications 212 for facilitating instant messaging (IM) between clients. The client 202 may send and receive IM messages 214 and/or email messages 216 to other clients 202 via the server 204.

Figure 3A:
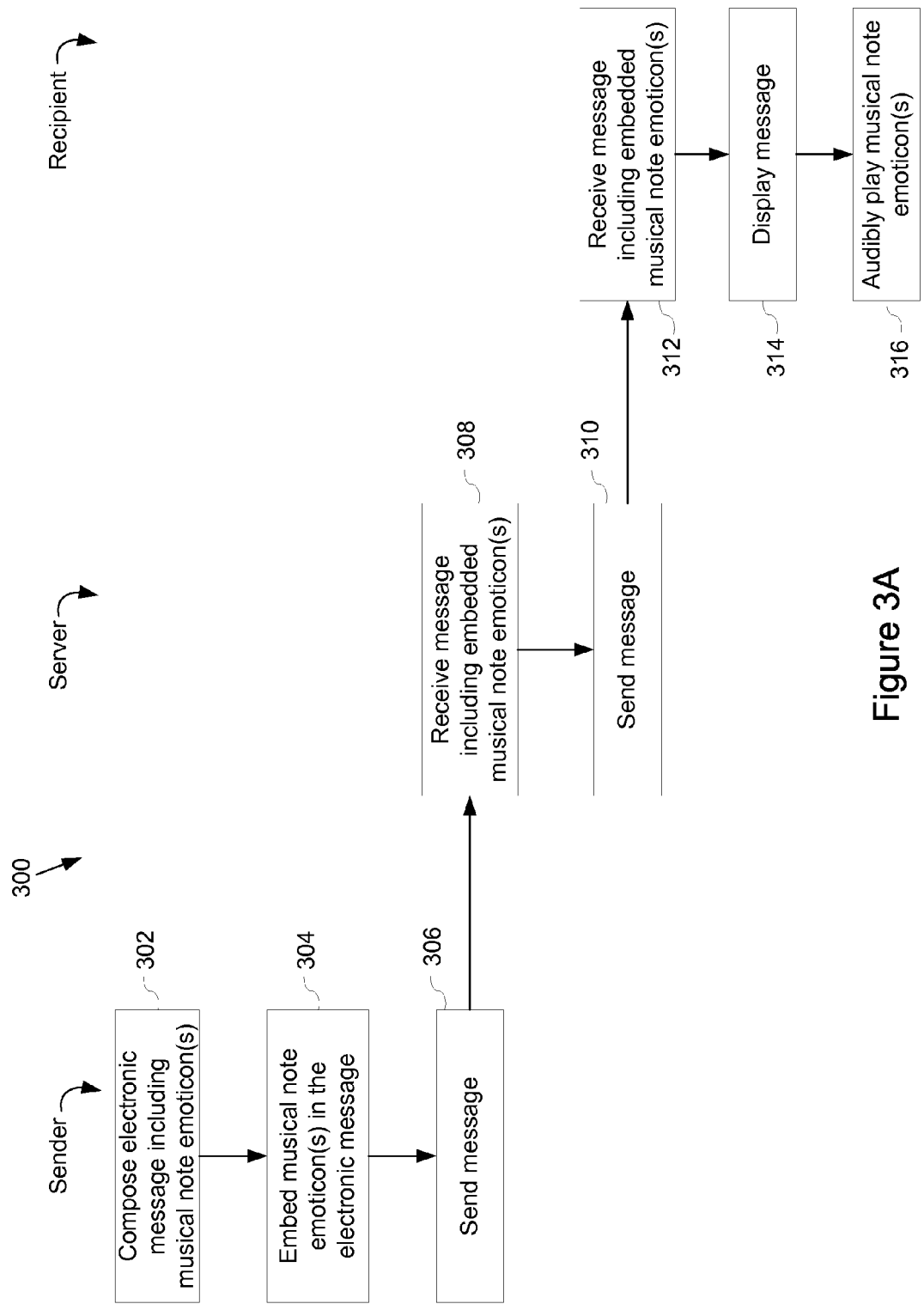
FIGS. 3A and 3B are a flow diagrams of a process for sending and receiving an electronic message with embedded musical note emoticons.

FIG. 3A is a flow diagram of a process 300 for sending and receiving an electronic message with embedded musical note emoticons. A sender composes an electronic message, including at least one musical emoticon 302. The musical note emoticon is embedded in the electronic message 304 and the message is sent 306. A server receives the message with the embedded musical emoticon 308 and sends the message 310 to an intended recipient. The recipient receives the message, including the embedded musical note emoticon(s) 312. The message is displayed 314. The musical note emoticons are also displayed in the message and audibly played 316.

In some embodiments, the musical note emoticons may be audibly replayed by hovering the mouse over the image of the displayed musical emoticon. With respect to the receiving client 104, as shown in FIG. 1A, after the electronic message is sent, the message, with the embedded musical note emoticon(s) is displayed in the display field 118 and audibly played. The musical note emoticon remains in the display field 118 and, as depicted in the flow diagram of FIG. 3B, may be replayed (322) by hovering the mouse over the displayed message (320) in display field 118. Additionally, in some embodiments, with respect to the sending client 102, the sequence or pattern of notes represented by the musical emoticons may be audibly previewed (332) prior to sending the message by hovering the mouse (330) over the musical emoticon(s) in the message composition GUI's display field 112, or alternatively by hovering the mouse over the musical emoticon characters in the composition field 108. The sending and receiving clients include executable instructions, for example in the operating system, browser application and/or IM messaging application, for detecting a mouse hover over the musical note emoticon(s) in a composed or received message.

Figure 3B:
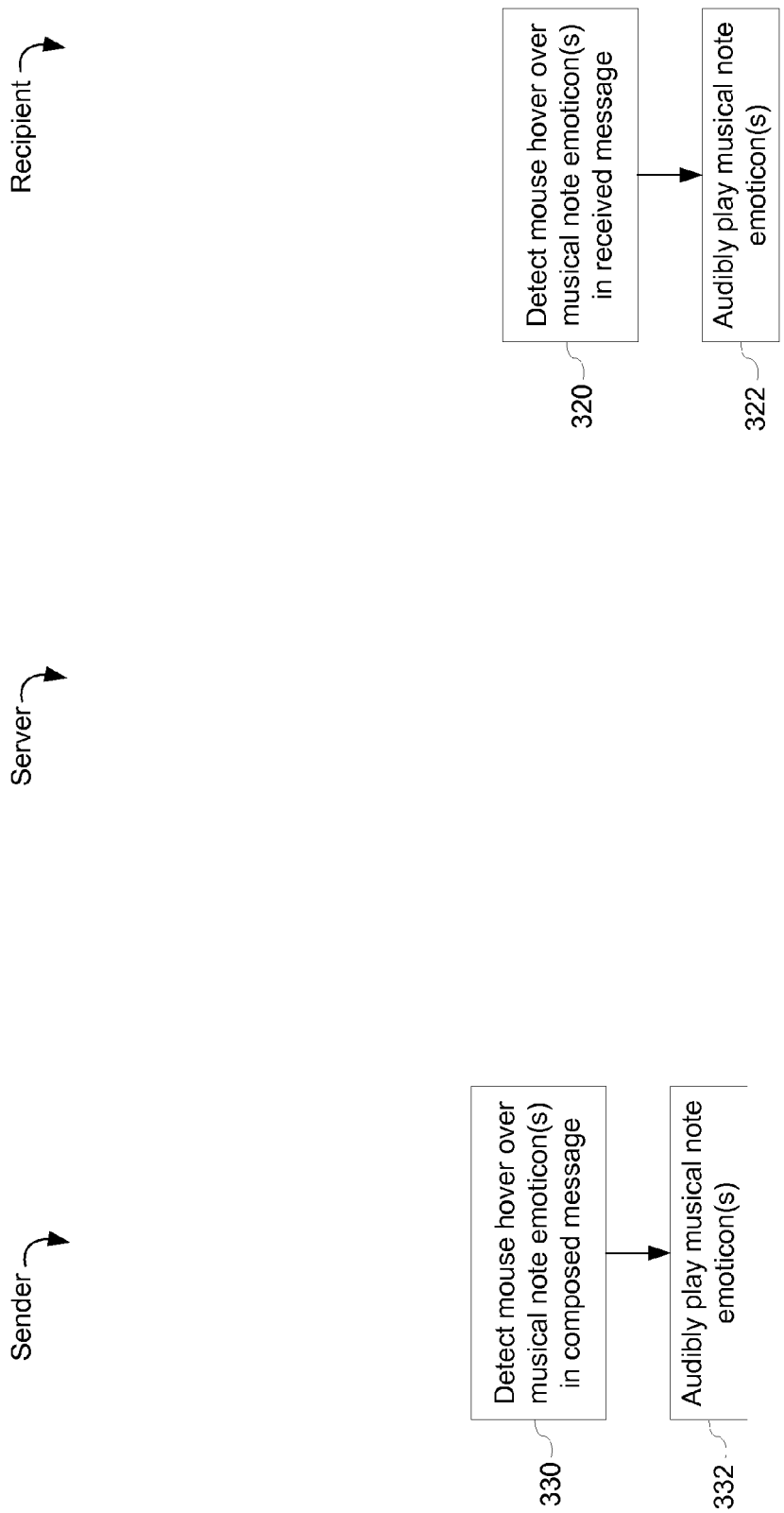

The sender, server and recipient systems may perform other operations as well during the process, or in conjunction with the process shown in FIGS. 3A and 3B. For instance, the sender or server may perform spell checking and other operations on the composed message, and the sender, server and/or recipient systems may store the message in a message database.

Figure 4:
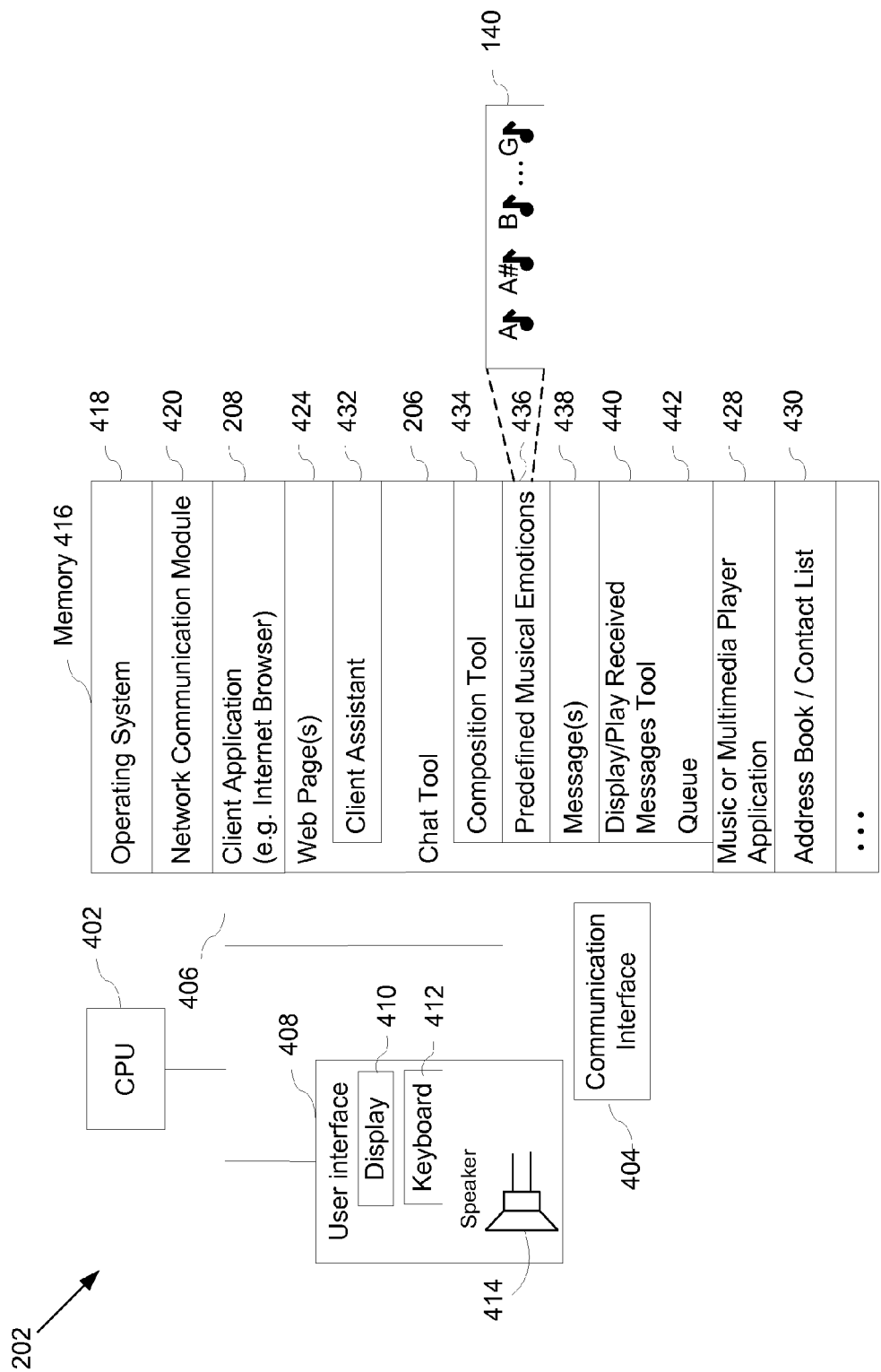
FIG. 4 is a block diagram illustrating an exemplary client in accordance with some embodiments of the present invention.

FIG. 4 is a block diagram illustrating an exemplary client 202 in accordance with some embodiments of the present invention. The client 202 may represent sending client 102 or receiving client 104 as shown in FIG. 1. The client 202 typically includes one or more processing units (CPU) 402, one or more network or other communication interfaces 404, and one or more communication buses 406 for interconnecting these parts. The communication buses 406 may include circuitry (sometimes called a chipset) that interconnects and controls communications between system components. The client 202 may also include a user interface 408 comprising a display 410, a keyboard 412, and one or more speakers 414 (sometimes called audio speakers or loudspeakers).

Client 202 also includes memory 416. Memory 416 includes high-speed random access memory, such as DRAM, SRAM, DDR RAM, or other random access solid state memory devices; and may include non-volatile memory, such as one or more magnetic disk storage devices, optical disk storage devices, or other non-volatile solid state storage devices. Memory 416 may optionally include one or more storage devices remotely located from the CPU(s) 402. In some embodiments, memory 416 stored the following programs, modules and data structures, or a subset thereof:

- an operating system 418 that includes procedures for handling various basic system services and for performing hardware dependent tasks;
- a network communication module 420 that is used for connecting the client 202 to other computers via the one or more communication network interfaces 404 and one or more communication networks, such as the Internet, other wide are networks, local area networks, metropolitan area networks, and so on;
- a client application 208 that can permit a user to interact with the client 202 as described above;
- one or more web pages 424 that may be displayed on client application 208;
- a chat tool 426;
- one or more music or multimedia player applications 428; and
- one or more address books or contact lists 430.

In some embodiments, the web pages 424 may include a client assistant 432. The client assistant 432 includes programs or instructions executed by the browser of client application 208. In one embodiment, the client assistant 432 is a web mail application with programs or instructions for composing email messages, including email messages having one or more musical emoticons. Furthermore, the client assistant 432 may include programs or instructions for displaying email messages and for playing musical emoticons. More specifically, the client assistant 432 may include programs or instructions for making procedure calls to the music or multimedia player to play musical emoticons embedded in an email message.

In some embodiments, the web mail application described above and the chat tool 206 comprise an integrated email and IM messaging application. The web mail application is implemented in web pages, with programs and instructions for implementing email composition, display, search and other functions embedded in the web pages of the web mail application.

The chat tool 426 facilitates instant messaging between clients 202 and may include a composition tool 434, one or more predefined musical emoticons 436, one or more messages 438, one or more tools 440 to display and/or play received messages, and a queue 442.

In some embodiments, the predefined musical emoticons 436 may be displayed in a menu or by selectable buttons. In some embodiments, the predefined musical emoticons 436 may be graphically represented and displayed in a menu 140 (as shown in FIG. 1C). In other embodiments, the predefined musical emoticons 436 may be displayed by buttons or other graphical representations.

In some embodiments, the queue 442 is a mechanism or module of the chat tool 426 that temporarily stores the musical emoticons and manages the order in which they are played by the player application 430. The musical emoticons are placed in the queue 442 in the same order that they appear in the electronic message. The musical emoticons are then removed from the queue 442 and played by the player application 430 in the order that they are placed in the queue 442 by the chat tool 434. In some embodiments, the queue 442 may be a separate module that is not a part of the chat tool 426. In other embodiments, the queue 442 may be included in the player application 430.

Figure 5:
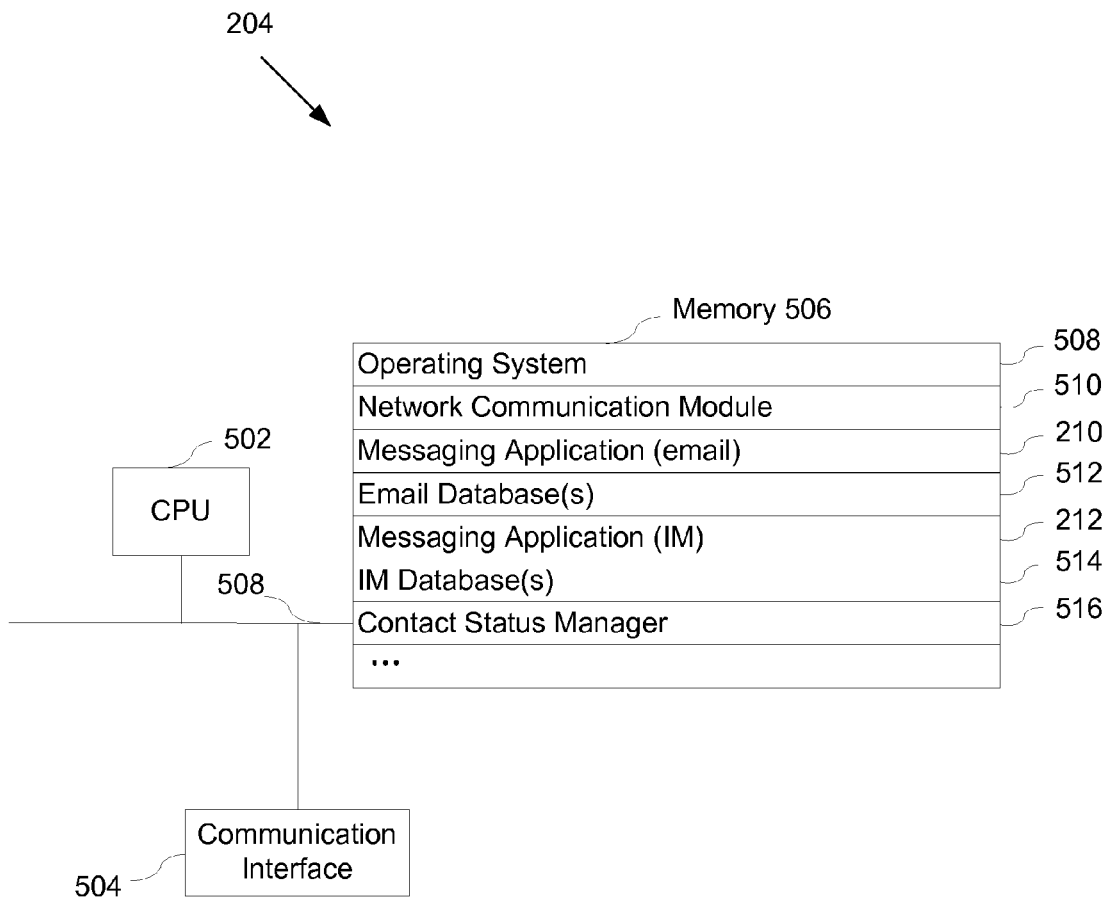
FIG. 5 is a block diagram illustrating an exemplary information server in accordance with some embodiments of the present invention.

FIG. 5 is a block diagram illustrating an exemplary information server 204 in accordance with some embodiments of the present invention. The server 204 typically includes one or more processing units (CPUs) 502, one or more network or other communication interfaces 504, memory 506, and one or more communication buses 508 for interconnecting these components. The communication buses 508 may include circuitry (sometimes called a chipset) that interconnects and controls communications between system components.

Memory 506 includes high-speed random access memory, such as DRAM, SRAM, DDR RAM, or other random access solid state memory devices; and may include non-volatile memory, such as one or more magnetic disk storage devices, optical disk storage devices, or other non-volatile solid state storage devices. Memory 506 may optionally include one or more storage devices remotely located from the CPU(s) 502. In some embodiments, memory 506 stores the following programs, modules and data structures, or a subset thereof:

- an operating system 508 that includes procedures for handling various basic system services and for performing hardware dependent tasks;
- a network communication module 510 that is used for connecting the client 202 to other computers via the one or more communication network interfaces 504 and one or more communication networks, such as the Internet, other wide are networks, local area networks, metropolitan area networks, and so on;
- a messaging application 210 for storing, indexing, searching and transporting email messages;
- one or more email databases 512;
- a messaging application 212 for facilitating instant messaging between clients;
- one or more IM databases 514; and
- a contact status manager 516.

The purpose of the contact status manager 516 is to provide online status information about the system's various users to the chat applications in the clients 102, 104, 202. The contact status manager gathers status information for contacts in a user's address book from the clients coupled to this messaging server 204 and from other messaging servers as well. The contact status sender sends the status information of contacts in a user's address book to the client associated with the user.

Each of the above identified elements in FIGS. 4 and 5 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 416 or 506 may store a subset of the modules and data structures identified above. Furthermore, memory 416 or 506 may store additional modules and data structures not described above.

Although FIGS. 4 and 5 show respectively a client 202 and a server 204, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement server 204 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer implemented method for authoring a message, comprising:
   enabling a user to compose an electronic message that includes a sequence of musical note emoticons that represent an audible musical sequence and also includes text; wherein the musical note emoticons in the sequence are selected from a set of distinct musical note emoticons, each associated with a distinct musical note;
   embedding the sequence of musical note emoticons within the text of the electronic message; and
   sending the electronic message.

2. The computer implemented method of claim 1, wherein each musical note emoticon corresponds to a musical note on a diatonic scale.

3. The computer implemented method of claim 2, including enabling the user to enter a sequence of printable characters identifying a respective musical note emoticon in the sequence of musical note emoticons.

4. The computer implemented method of claim 3, wherein the sequence of printable characters includes at least one character representing duration of the musical note emoticon.

5. The computer implemented method of claim 2, including selecting a respective musical note emoticon in the sequence of musical note emoticons from a predefined set of musical note emoticons.

6. The computer implemented method of claim 2, the method further including audibly playing the sequence of musical note emoticons.

7. The computer implemented method of claim 2, including selecting a respective musical note emoticon from a predefined set of musical note emoticons corresponding to distinct musical notes, and wherein the sequence of the musical note emoticons corresponds to a pattern of musical notes.

8. The computer implemented method of claim 7, wherein the pattern of musical notes corresponds to a song.

9. The computer implemented method of claim 1, including entering at least one printable character corresponding to the duration of a respective musical note emoticon in the sequence of musical note emoticons.

10. A computer implemented method for receiving a message, comprising:
    receiving an electronic message, including text and at least one musical note emoticon in a sequence of musical note emoticons embedded within the text of the electronic message, wherein the sequence of musical note emoticons represent an audible musical sequence, and wherein the musical note emoticons in the sequence are selected from a set of distinct musical note emoticons, each associated with a distinct musical note;
    displaying the electronic message, including the sequence of musical note emoticons; and
    audibly playing the embedded sequence of musical note emoticons.

11. The computer implemented method of claim 10 wherein the sequence of musical note emoticons corresponds to a pattern of musical notes.

12. The computer implemented method of claim 11, wherein each musical note emoticon corresponds to a musical note on a diatonic scale and to a respective graphical image.

13. The computer implemented method of claim 10 wherein receiving the electronic message includes receiving a sequence of musical note emoticons corresponding to a pattern of musical notes and audibly playing the pattern of musical notes in sequential order.

14. A system for authoring a message, comprising:
    memory;
    one or more processors; and
    one or more modules stored in memory and configured for execution by the one or more processors, the modules comprising:
       instructions for enabling a user to compose an electronic message that includes a sequence of musical note emoticons that represent an audible musical sequence and also includes text; wherein the musical note emoticons in the sequence are selected from a set of distinct musical note emoticons, each associated with a distinct musical note;
       instructions for embedding the sequence of musical note emoticons within the text of the electronic message; and
       instructions for sending the electronic message.

15. The system of claim 14, wherein each musical note emoticon corresponds to a musical note on a diatonic scale.

16. The system of claim 15, wherein each musical note emoticon corresponds to a specific graphical image.

17. A system for receiving a message, comprising:
    memory;
    one or more processors;
    one or more speakers; and
    one or more modules stored in memory and configured for execution by the one or more processors, the modules comprising:
       instructions for receiving an authored electronic message, including text and at least one audible musical note emoticon in a sequence of musical note emoticons embedded within the text of the electronic message, wherein the sequence of musical note emoticons represent an audible musical sequence, and wherein the musical note emoticons in the sequence are selected from a set of distinct musical note emoticons, each associated with a distinct musical note;

instructions for displaying the electronic message, including the sequence of musical note emoticons; and instructions for audibly playing the embedded sequence of musical note emoticons.

18. The system of claim 17, wherein each musical note emoticon corresponds to a musical note on a diatonic scale.

19. The system of claim 18, wherein each musical note emoticon corresponds to a specific graphical image.

20. The system of claim 18, wherein the instructions for receiving the authored electronic message include receiving a sequence of musical note emoticons corresponding to a pattern of musical notes and audibly playing the pattern of musical notes.

21. A computer program product for use in conjunction with a computer, the computer program product comprising a computer readable storage medium and a computer program mechanism embedded therein, the computer program mechanism comprising:

instructions for enabling a user to compose an electronic message that includes a sequence of musical note emoticons that represent an audible musical sequence and also includes text; wherein the musical note emoticons in the sequence are selected from a set of distinct musical note emoticons, each associated with a distinct musical note;

instructions for embedding the sequence of musical note emoticons within the text of the electronic message; and instructions for sending the electronic message.

22. A computer program product for use in conjunction with a computer, the computer program product comprising a computer readable storage medium and a computer program mechanism embedded therein, the computer program mechanism comprising:

instructions for receiving an authored electronic message, including text and at least one audible musical note emoticon in a sequence of musical note emoticons embedded within the text of the electronic message, wherein the sequence of musical note emoticons represent an audible musical sequence, and wherein the musical note emoticons in the sequence are selected from a set of distinct musical note emoticons, each associated with a distinct musical note;

instructions for displaying the electronic message, including the sequence of musical note emoticons; and instructions for audibly playing the embedded sequence of musical note emoticons.

23. A computer comprising:

means for enabling a user to compose an electronic message that includes a sequence of musical note emoticons that represent an audible musical sequence and also includes text; wherein the musical note emoticons in the sequence are selected from a set of distinct musical note emoticons, each associated with a distinct musical note;

means for embedding the sequence of musical note emoticons within the text of the electronic message; and means for sending the electronic message.

* * * * *